(12) United States Patent
Miyazoe et al.

(10) Patent No.: US 7,118,087 B2
(45) Date of Patent: Oct. 10, 2006

(54) COUPLING SOLENOID VALVE

(75) Inventors: Shinji Miyazoe, Tsukuba-gun (JP); Katsuyuki Senba, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 66 days.

(21) Appl. No.: 11/054,553

(22) Filed: Feb. 10, 2005

(65) Prior Publication Data

US 2005/0236595 A1 Oct. 27, 2005

(30) Foreign Application Priority Data

Apr. 22, 2004 (JP) ............................. 2004-127128

(51) Int. Cl.
*F15B 13/043* (2006.01)
(52) U.S. Cl. ............... 251/26; 251/129.09; 137/625.64
(58) Field of Classification Search .................. 251/26; 137/625.64
See application file for complete search history.

(56) References Cited

U.S. PATENT DOCUMENTS

| | | | |
|---|---|---|---|
| 5,437,306 A * | 8/1995 | Asou et al. | 137/625.64 |
| 5,558,126 A * | 9/1996 | Hayashi et al. | 137/625.64 |
| 5,597,015 A * | 1/1997 | Asou et al. | 137/625.64 |
| 5,944,056 A * | 8/1999 | Miyazoe et al. | 137/625.64 |
| 6,109,298 A * | 8/2000 | Kaneko et al. | 137/551 |
| 6,913,037 B1 * | 7/2005 | Miyazoe et al. | 137/557 |
| 7,032,789 B1 * | 4/2006 | Hayashi | 251/129.09 |
| 2004/0004808 A1 * | 1/2004 | Tsunooka et al. | 361/679 |
| 2004/0222397 A1 * | 11/2004 | Hayashi | 251/129.09 |
| 2005/0236595 A1 | 10/2005 | Miyazoe et al. | |

FOREIGN PATENT DOCUMENTS

JP 10-47509 2/1998

OTHER PUBLICATIONS

U.S. Appl. No. 11/233,066, filed Sep. 23, 2005, Miyazoe et al.
U.S. Appl. No. 11/054,553, filed Feb. 10, 2005, Miyazoe et al.
U.S. Appl. No. 11/054,442, filed Feb. 10, 2005, Miyazoe et al.
U.S. Appl. No. 11/054,380, filed Feb. 10, 2005, Miyazoe et al.

* cited by examiner

*Primary Examiner*—J. Casimer Jacyna
(74) *Attorney, Agent, or Firm*—Oblon, Spivak, McClelland, Maier & Neustadt, P.C.

(57) ABSTRACT

A coupling solenoid valve having a main valve unit and a solenoid operating unit, of which both side faces in the valve-width direction correspond to a first coupling face and a second coupling face for coupling another solenoid valve, wherein pilot valves are detachably attached to the top and bottom faces of a center base extending from an adapter block, electroconductive fittings for electrically connecting between coil terminals and board terminals of each pilot valve, and folding-type elastic terminal portions are provided on both ends, these elastic terminal portions are flexibly in contact with the coil terminals and the board terminals from the side-face direction.

7 Claims, 7 Drawing Sheets

COUPLING SOLENOID VALVE

TECHNICAL FIELD

The present invention relates to a coupling solenoid valve, and more specifically relates to a coupling solenoid valve to be used in a solenoid valve assembly form by mutually connecting plurality of solenoid valves.

PRIOR ART

A technique using plurality of solenoid valves mutually connected in a solenoid valve assembly form has been conventionally known as disclosed in Patent Document No. 1 for example. This kind of solenoid valve assembly generally comprises plurality of coupling solenoid valves including coupling communication holes to be mutually connected by coupling, a port block including integrated air-supply/discharge ports, a connector block including an integrated power-supply electrical connector, and an end block to be disposed as necessary, which are mounted on a rail in array, and are fixed in a coupled state.

On the other hand, the coupling solenoid valve includes a main valve unit configured so as to switch a fluid channel using a spool, and a solenoid operating unit for driving the spool, this solenoid operating unit includes one or two pilot valves, and is configured such that this pilot valve switches the spool by applying action force from to pilot air to the spool. This solenoid operating unit further includes an external connection terminal, and this terminal is connected to an electrical connector of the connector block using a lead wire.

However, most of the types of conventional coupling solenoid valves include a type of the solenoid operating unit of which the pilot valve is sealed within the synthetic resin inner portion along with the related components, and accordingly, the pilot valve cannot be disassembled and repaired even if a small malfunction occurs. Even if a type capable of disassembling is employed, the configuration of the electroconductive mechanism connecting the external connection terminal with the pilot valve is complex, and includes many insertion-type connection portions, and accordingly, disassembling and assembling thereof is troublesome. Furthermore, the terminal needs to be connected with the electrical connector of the connector block using a lead wire, and accordingly, connection work thereof is troublesome.

Patent Document No. 1: Japanese Publication of Application No. 10-47509

DISCLOSURE OF THE INVENTION

Accordingly, it is an object of the present invention to allow the solenoid operating unit to be disassembled, and to facilitate disassembling and assembling by simplifying the electroconductive mechanism connecting to the pilot valve with the external connection connector, with a coupling solenoid valve to be used in a solenoid valve assembly form by mutually connecting plurality of solenoid valves.

In order to achieve the aforementioned object, the present invention provides a coupling solenoid valve of which both side faces in the valve-width direction correspond to a first coupling face and a second coupling face for being coupled with another solenoid valve, the coupling solenoid valve comprises a main valve unit including plurality of coupling communication holes passing through in the valve-width direction, a valve hole through which the coupling communication holes mutually communicate, and a spool for switching a channel accommodated within the valve hole; and a solenoid operating unit connected with the main valve unit. The solenoid operating unit comprises: an adapter block attached to the main valve unit; a center base extending from this adapter block; one or two pilot valves detachably assembled to this center base; a coupling connector, which is mutually connected to an insertion type when plurality of solenoid valves are coupled, for electrically connecting between the adjacent solenoid valves; and an electroconductive mechanism for electrically connecting this coupling connector to the pilot valves. Also, the electroconductive mechanism comprises: an electroconductive board electrically connected to the coupling connector; board terminals protruding from this electroconductive board; a coil terminal formed on the side face on the center base side of the pilot valves; and electroconductive fittings electrically connecting this coil terminal with the board terminals; wherein these electroconductive fittings are supported by the center base, and include elastic terminal portions formed by being folded on both end portions, and these elastic terminal portions are flexibly in contact with the coil terminal and the board terminals from the side-face direction.

With the present invention, the electroconductive fittings, which are made up of a slender metal plate, comprises: a main body portion extending along the center base; and the elastic terminal portions positioned on both ends of this main body portion; wherein these elastic terminal portions are formed by the end portion of the metal plate being folded in a flat shape.

Also, according to the present invention, a cover in the shape of a generally square with one end open is detachably attached to the adapter block, and this cover covers the top and bottom faces of the solenoid operating unit and the end face of the tip side of the center base.

Furthermore, with the present invention, the coupling connector comprises: a connector board having a recessed reception portion and a protruding insertion portion on both ends in the horizontal-width direction; plurality of connection terminals formed in the reception portion and the insertion portion respectively, mutually electrically connected by printed wiring; and an extracting terminal which conducts with a part of the connection terminals; wherein the electroconductive board is electrically connected to this extracting terminal.

Thus, according to the coupling solenoid valve of the present invention, the solenoid operating unit can be disassembled at the time of maintenance and inspection. Moreover, the electroconductive fittings for electrically connecting the coil terminal with the board terminal are configured so as to have folding-type elastic terminal portions on both ends thereof, and these elastic terminal portions are flexibly in contact with the coil terminal and the board terminal from the side-face direction, thereby facilitating work for disassembling and assembling the solenoid operating unit as compared to a method for connecting the terminals in the insertion method.

DESCRIPTION OF THE PREFERRED EMBODIMENTS

Figure 1:
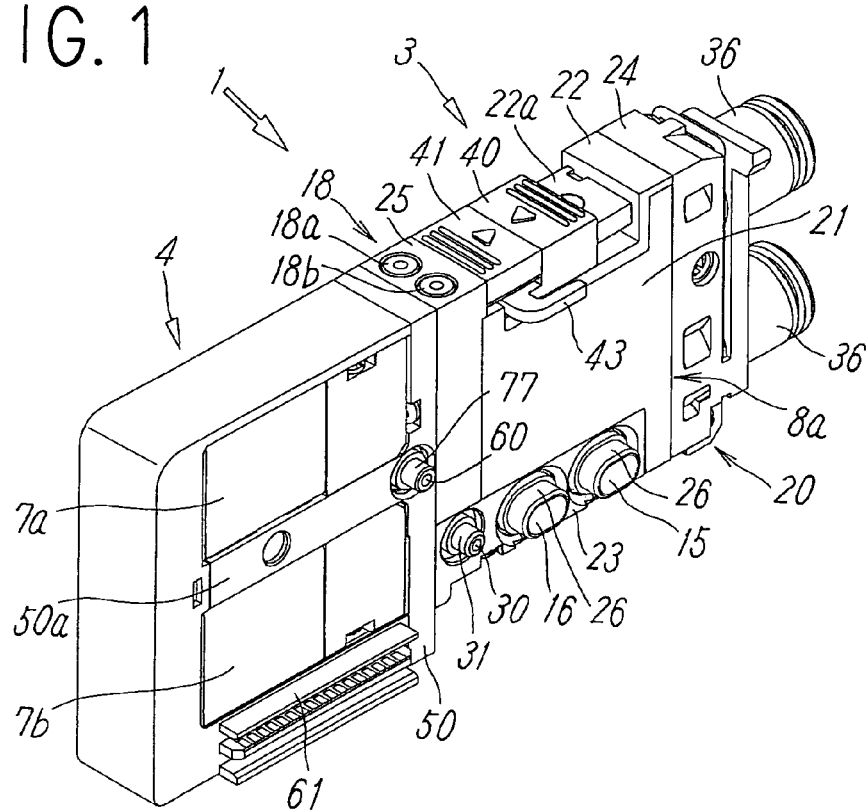
FIG. 1 is a perspective view of a coupling solenoid valve according to the present invention as viewed from a first coupling face side.
Figure 2:
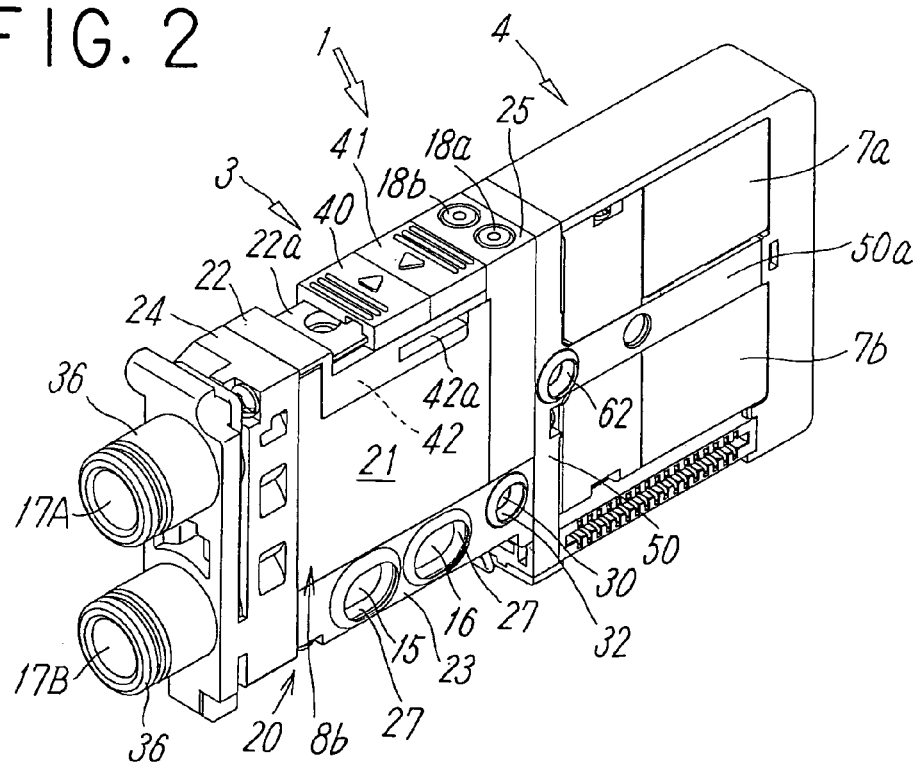
FIG. 2 is a perspective view of the solenoid valve in FIG. 1 as viewed from a second coupling face side.

FIG. 1 and FIG. 2 illustrate an embodiment of a coupling solenoid valve according to the present invention. This solenoid valve 1 includes, as can be understood from FIG. 3 and FIG. 4, a main valve unit 3 configured so as to switch an air channel using a spool 6, and a pilot-type solenoid operating unit 4 connected to one end side of this main valve unit 3 in the axial direction (longitudinal direction), and is a double-pilot-type solenoid valve for controlling pilot air using two pilot valves 7a and 7b of this solenoid operating unit 4 to drive the spool 6. Also, both side faces of this solenoid valve 1 in the valve-width direction (horizontal-width direction) correspond to a practically flat first coupling face 8a and a practically flat second coupling face 8b for coupling another solenoid valve 1.

The main valve unit 3 having a 5-port-type valve configuration comprises a valve hole 10 extending in the axial direction, five air openings 11, 12A, 12B, 13A, and 13B for supply, output, and discharge, each of which mutually opens at a position different from the valve hole 10, the spool 6, which is slidably inserted in the valve hole 10, for switching a channel between these air openings, two pistons 14a and 14b, which are in contact with both ends of the spool 6 in the axial direction and are driven by pilot air supplied from the solenoid operating unit 4, for switching the spool 6, plurality of coupling communication holes 15 and 16 passing through the main valve unit 3 in the valve-width direction, two output ports 17A and 17B provided on the end face of the opposite side of the side where the solenoid operating unit 4 of the main valve unit 3 is connected, and a manual operating portion 18 including two manual buttons 18a and 18b capable of switching the spool 6.

The example illustrated in the drawings is provided with the two coupling communication holes 15 and 16, wherein one, i.e., the coupling communication hole 15 is for main air supply and the other, i.e., the coupling communication hole 16 is for main air discharge. The coupling communication hole 15 for supply is connected to the air opening 11 for supply via a branch hole 11a, and the coupling communication hole 16 for discharge is connected to the two air openings 13A and 13B for discharge via branches 13a and 13b in common. However, an arrangement may be made wherein the two coupling communication holes 16 for discharge are provided, and one is connected to the air opening 13A for discharge and the other is connected to the air opening 13B for discharge. Also, the output port 17A is connected to the air opening 12A for output via an output communication hole 12a, and the output port 17B is connected to the air opening 12B for output via an output communication hole 12b.

A housing 20 of the main valve unit 3 is divided into plurality of blocks. More specifically, the housing 20 includes a center block 21 positioned in the center of the housing 20, a top block 22 connected to the upper end portion of the center block 21, a bottom block 23 connected to the lower end portion of the center block 21, an output block 24 connected to a first end side of the center block 21 in the axial direction (longitudinal direction), and a manual block 25 connected to a second end side serving as the opposite side of the center block 21, and is formed by these blocks having a rectangular cross-sectional shape so as to assume a generally rectangular longitudinal cross-sectional shape as a whole.

The valve hole 10 extending in the axial direction is formed within the center block 21, and the coupling communication holes 15 and 16 are formed in the bottom block 23. These coupling communication holes 15 and 16 include a connection tube 26 protruding on the first coupling face 8a side, and a circular seal member 27 applied within each communication hole on the second coupling face 8b side respectively, and in the event that the plurality of solenoid valves 1 are coupled, the corresponding coupling communication holes 15 and the corresponding coupling communication holes 16 are connected in an airtight manner respectively by mutually fitting the connection tube 26 and seal member 27 of the adjacent solenoid valves 1.

A pilot supply communication hole 30 passing through the bottom block 23 in the valve-width direction is further formed within the bottom block 23. This pilot supply communication hole 30 communicates with the two pilot valves 7a and 7b of the solenoid operating unit 4 and the manual operating portion 18 via a pilot branch hole omitted in the drawings. This pilot supply communication hole 30 also includes a connection tube 31 and a seal member 32, in the same way as the case of the coupling communication holes 15 and 16.

Note that the connection tubes 26 and 31 may be formed separately from the bottom block 23, and attached within the coupling communication holes 15 and 16 and the pilot supply communication hole 30, but in the event that the bottom block 23 is made up of a synthetic resin, these may be formed integrally with this bottom block 23.

With the output block 24 and the manual block 25 each of which a piston chamber is formed, the piston chamber of the output block 24 accommodates the piston 14a, and the piston chamber of the manual block 25 accommodates the piston 14b. Also, a pilot pressure chamber 35a is provided on the back face of the piston 14a, and a pilot pressure chamber 35b is provided on the back face of the piston 14b, and these pilot pressure chambers 35a and 35b communicate with the pilot valves 7a and 7b and the pilot supply communication hole 30, which are the corresponding one side thereof, by means of individual pilot output channels omitted in the entire drawing via the manual buttons 18a and 18b, which are the corresponding other side thereof, respectively. In the example illustrated in the drawing, the diameters of the two pistons 14a and 14b are different in size, i.e., the diameter of the first piton 14a is greater than the diameter of the second piston 14b, but an arrangement may be made wherein these are the same in size.

Upon the first pilot valve 7a on one side being activated so as to supply pilot air to the first pilot pressure chamber 35a, the spool 6 moves to the first switching position in FIG.

3 due to actions of the first piston 14a, the air opening 11 for supply communicates with the second air opening 12B for output so as to abstract air output from the second output port 17B, and also the first air opening 12A for output communicates with the first air opening 13A for discharge so as to place the first output port 17A in a ventilating state. Conversely, upon the second pilot valve 7b on the other side being activated so as to supply pilot air to the second pilot pressure chamber 35b, the spool 6 moves to the position opposite from the first switching position in FIG. 3 due to actions of the second piston 14b, the air opening 11 for supply communicates with the first air opening 12A for output so as to abstract air output from the first output port 17A, and also the second air opening 12B for output communicates with the second air opening 13B for discharge so as to place the second output port 17B in a ventilating state.

A quick-connection-type tube joint 36, which can connect a piping tube in a state safe from falling out simply by inserting the tube thereto, is attached to the output ports 17A and 17B formed within the output block 24 by a clip 37 respectively.

The manual operating portion 18 is for reproducing a switching state with the pilot valves 7a and 7b by means of manual operations, and includes the two manual buttons 18a and 18b disposed in array on the top face of the manual block 25 in the valve-width direction, wherein the first manual button 18a corresponds to the first pilot valve 7a, and the second manual button 18b corresponds to the second pilot valve 7b. Upon the first manual button 18a being depressed, the pilot supply communication hole 30 directly communicates with the first pilot pressure chamber 35a through a pilot output channel without passing through the first pilot valve 7a, on the other hand, upon the second manual button 18b being depressed, the pilot supply communication hole 30 directly communicates with the second pilot pressure chamber 35b through a pilot output channel without passing through the second pilot valve 7b.

Figure 6:
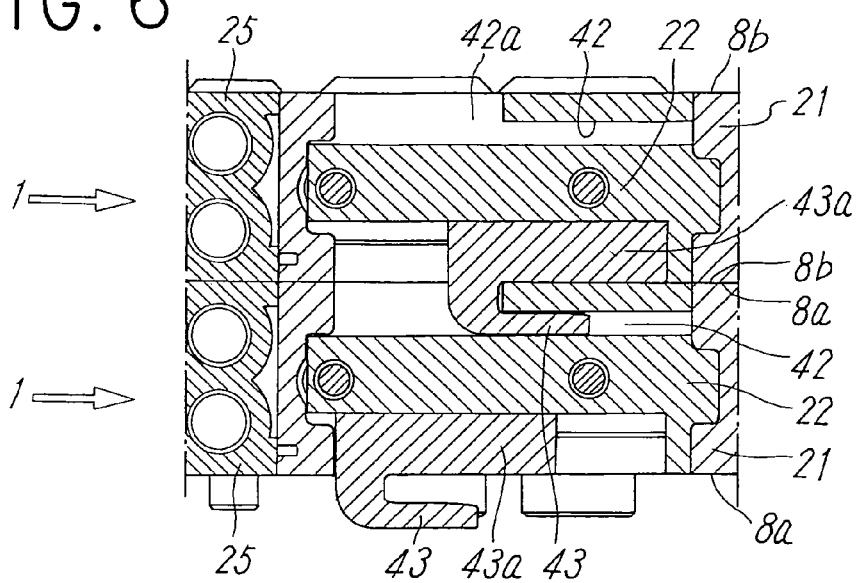
FIG. 6 is a cross-sectional view of the principal components in a state in which two adjacent solenoid valves are coupled.

The top block 22 is fixed within a recessed stage portion 21a on the top face of the center block 21 with a screw 22b. A flat rail-shaped guide 22a extending in the axial direction of the main valve unit 3 is formed on the top face of this top block 22, and a binding member 40 and safety member 41, which are adjacent to each other, are assembled on the guide 22a so as to move along the guide 22a. As can be understood from FIG. 2 and FIG. 6, a hook-engaging portion 42 extending in the axial direction of the main valve unit 3 is provided on the side face of the second coupling face 8b side of the top block 22, and a hook insertion opening 42a is opened on the second coupling face 8b adjacent to the engaging portion 42.

The binding member 40 serving as a groove-shaped member is mounted on the guide 22a so as to overstride the guide 22a. A side wall portion 40b extending downward is formed on one side face of the binding member 40, i.e., on the side face of the first coupling face 8a side, and a hook 43 for engaging extending in the axial direction of the housing 20 is integrally formed on the lower end portion of the side wall portion 40b via the hook supporting wall 43a. This hook 43 is for engaging with the engaging portion 42 of the adjacent solenoid valve 1 at the time of coupling plurality of solenoid valves 1. The binding member 40 is configured so as to control the hook 43 to move between the binding position to be engaged with the engaging portion 42 of the adjacent solenoid valve 1 (solenoid valve 1 illustrated at the upper side in FIG. 6) and the separating position to be disengaged from this engaging portion 42 (solenoid valve 1 illustrated at the lower side in FIG. 6).

The safety member 41 serving as a groove-shaped member is mounted on the guide 22a so as to overstride the guide 22a. A locking wall 41a extending in the horizontal direction is formed on one end of the safety member 41, i.e., one end portion of the solenoid operating unit 4 side, and two recessed portions 41b and 41b capable of fitting and locking the grooves 18c of the two manual buttons 18a and 18b are formed on the tip portion of the locking wall 41a.

This safety member 41 is disposed on the position adjacent to the binding member 40, and in the event that this binding member 40 is positioned on the separating position, as illustrated in FIG. 1, the two recessed portions 41b and 41b of the tip of the locking wall 41a are pressed by the binding member 40 so as to move to the position for locking the groove portions 18c of the two manual buttons 18a and 18b in an inoperable state. On the other hand, in the event that the binding member 40 is positioned on the binding position as illustrated in FIG. 3, the two manual buttons 18a and 18b are released from the binding member 40, and the two recessed portions 41b and 41b are capable of disengaging from the manual buttons 18a and 18b so as to move to the position for releasing the locked state.

Figure 9:
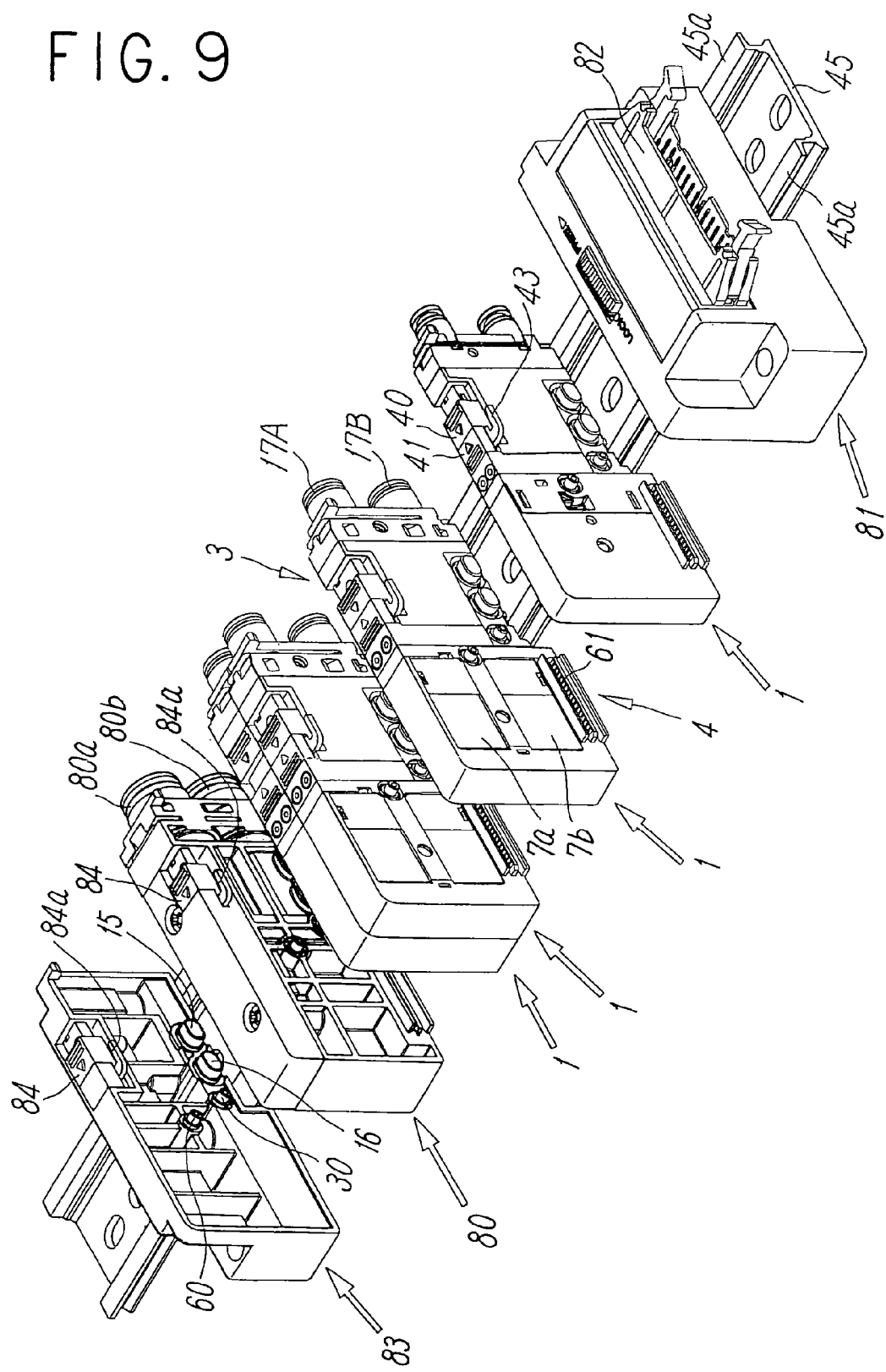
FIG. 9 is a perspective view illustrating a process on the way to forming a solenoid valve assembly by mounting the solenoid valve in FIG. 1 on a rail.

A recessed rail attachment portion 46 capable of fitting to a rail 45 is formed on the bottom face of the main valve unit 3. This rail attachment portion 46 includes an attachment groove 47 formed on the lower end portion of the output block 24, and a rail clip 48 provided on the lower end portion of the bottom block 23, and these attachment groove 47 and rail clip 48 are retained by flange portions 45a on both side ends of the rail 45 as illustrated in FIG. 9, thereby mounting the solenoid valve 1 on the rail 45. Note that the rail 45 is a DIN rail.

Figure 3:
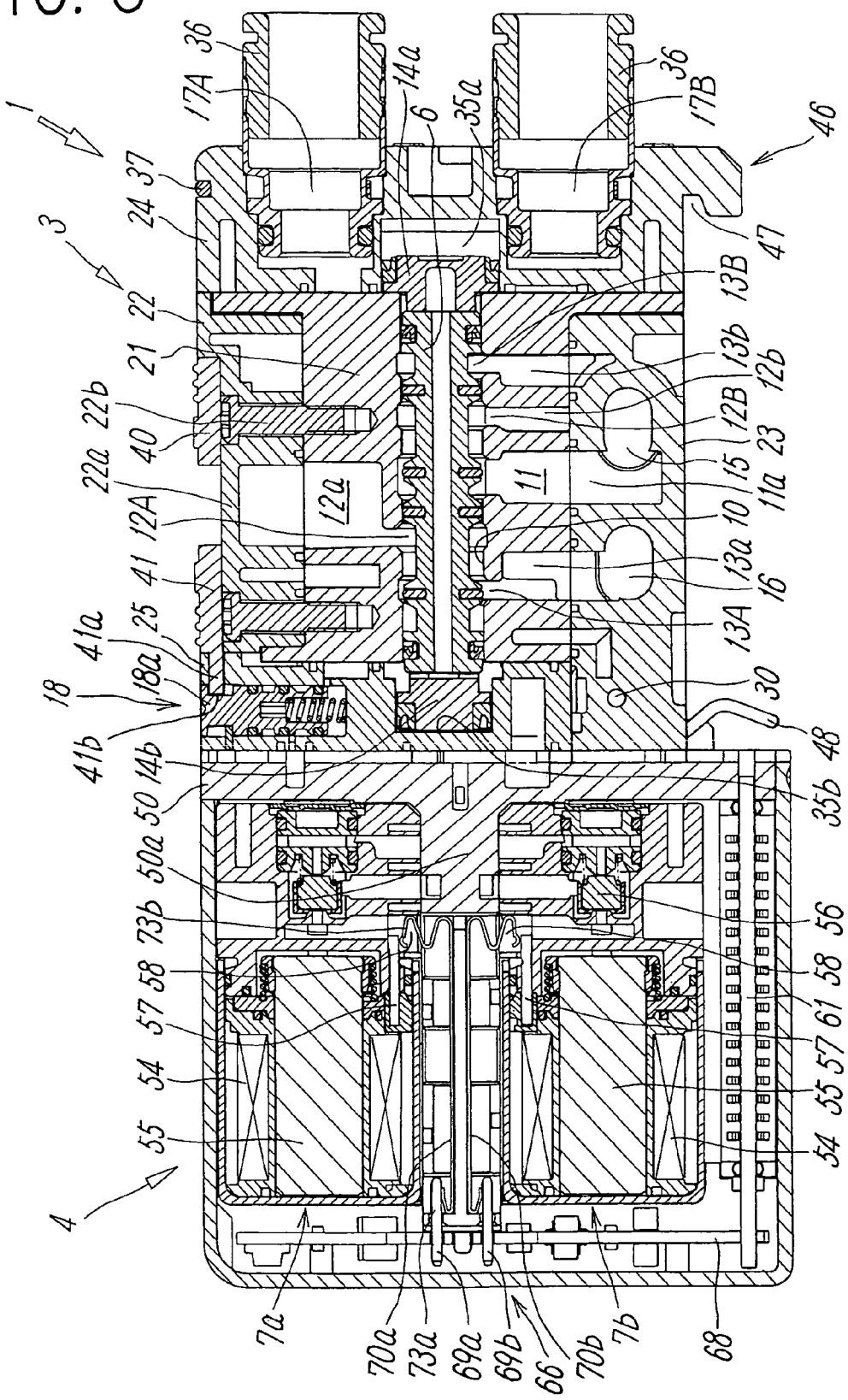
FIG. 3 is a cross-sectional view of the solenoid valve in FIG. 1.
Figure 4:
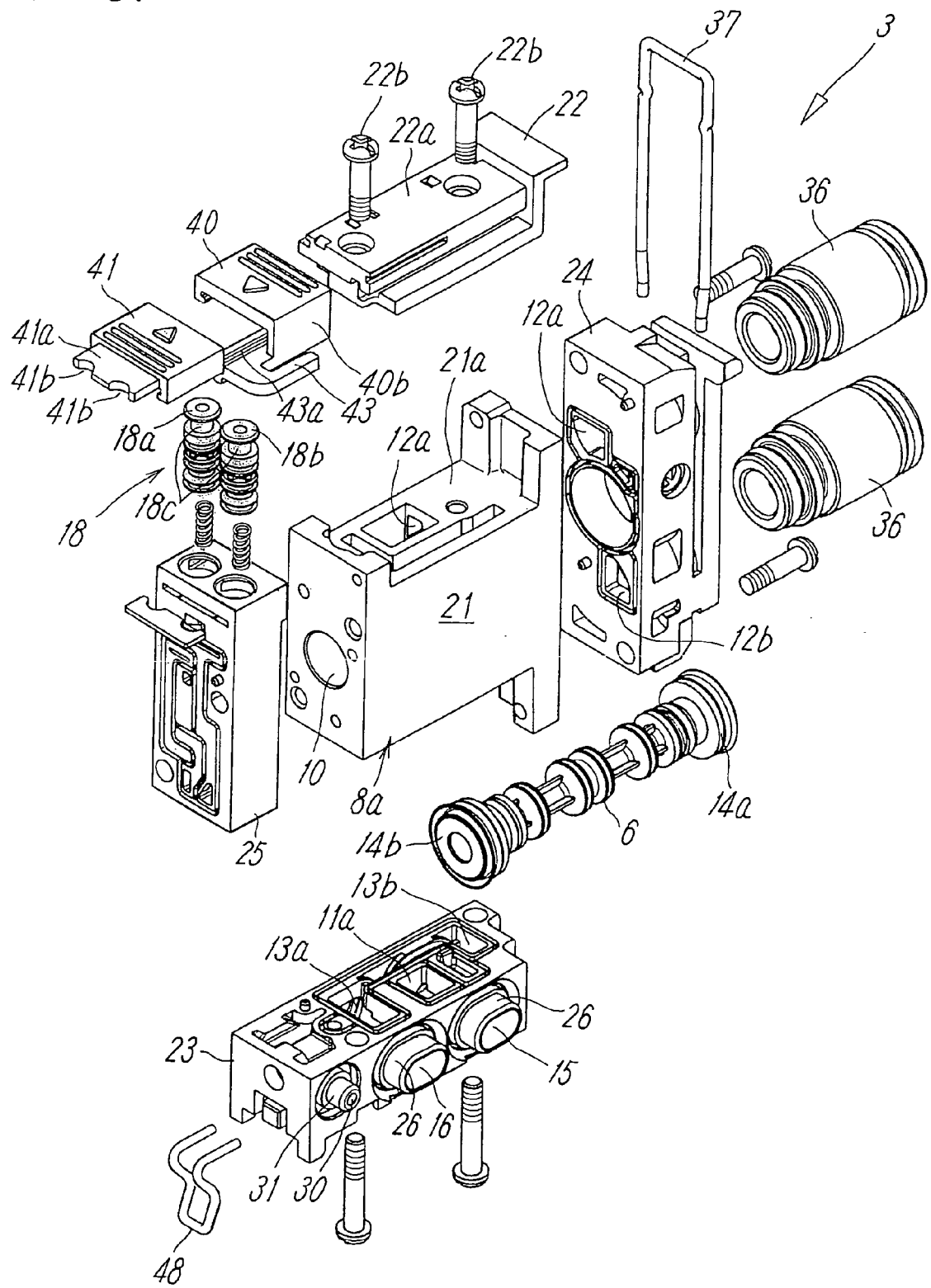
FIG. 4 is a perspective view illustrating a disassembled main valve unit of the solenoid valve in FIG. 1.
Figure 5:
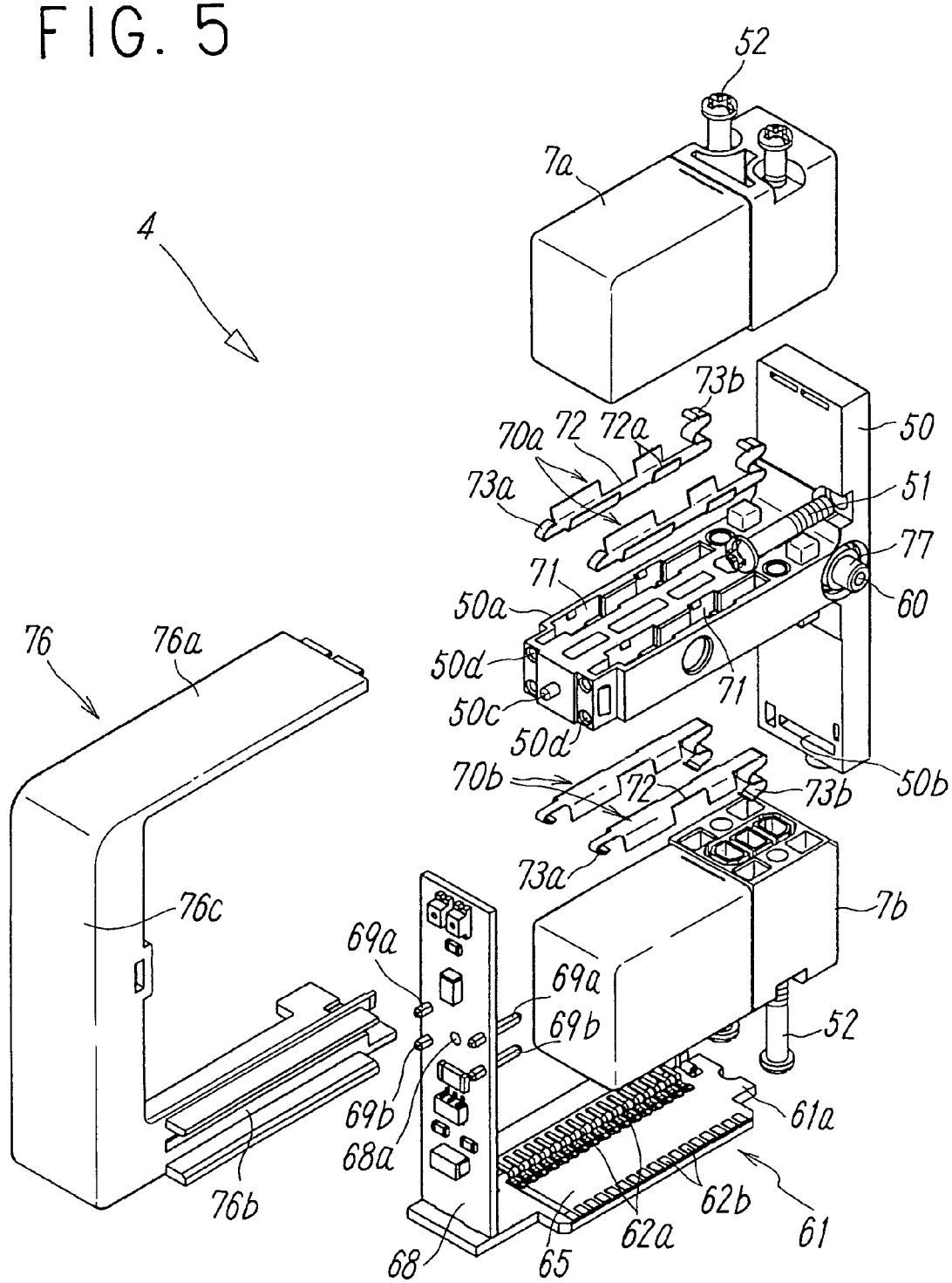
FIG. 5 is a perspective view illustrating a disassembled solenoid operating unit of the solenoid valve in FIG. 1.

The solenoid operating unit 4, as can be understood from FIG. 3 and FIG. 5, includes the housing 20 of the main valve unit 3, i.e., a synthetic resin adapter block 50 coupled with the manual block 25 and the bottom block 23 with a screw 51. This adapter block 50 integrally includes a center base 50a extending perpendicular from the intermediate position thereof, and the first pilot valve 7a and the second pilot valve 7b, which are disposed so as to mutually direct the axial line thereof in parallel, are detachably attached on both the upper and lower faces of the center base 50a with a screw 52.

The pilot valves 7a and 7b include exciting coils 54, a movable iron core 55 to be displaced due to magnetic force generated at the time of turning on the exciting coils 54, a valve member 56 for opening/closing a pilot valve sheet, which is driven by the movable iron core 55, and coil terminals 57 communicating with the exciting coils 54, and these coil terminals 57 are exposed within a connection hole 58 formed on the side face of the center base 50a side of the respective pilot valves 7a and 7b.

The output opening of the first pilot valve 7a communicates with the first pilot pressure chamber 35a, the output opening of the second pilot valve 7b communicates with the second pilot pressure chamber 35b, the input openings of both pilot valves 7a and 7b communicate with the pilot supply communication hole 30 in common, and the discharge openings of both pilot valves 7a and 7b communicate with a pilot discharge communication hole 60 in common. Accordingly, when the first pilot valve 7a is turned on, pilot air from the pilot supply communication hole 30 is supplied to the first pilot pressure chamber 35a so as to drive the first piston 14a, on the other hand, when the second pilot valve 7b is turned on, pilot air from the pilot supply communication hole 30 is supplied to the second pilot pressure chamber 35b so as to drive the second piston 14b.

Note that the configurations of the pilot valves 7a and 7b are known; accordingly, further detailed description regarding the configurations thereof will be omitted.

Figure 7:
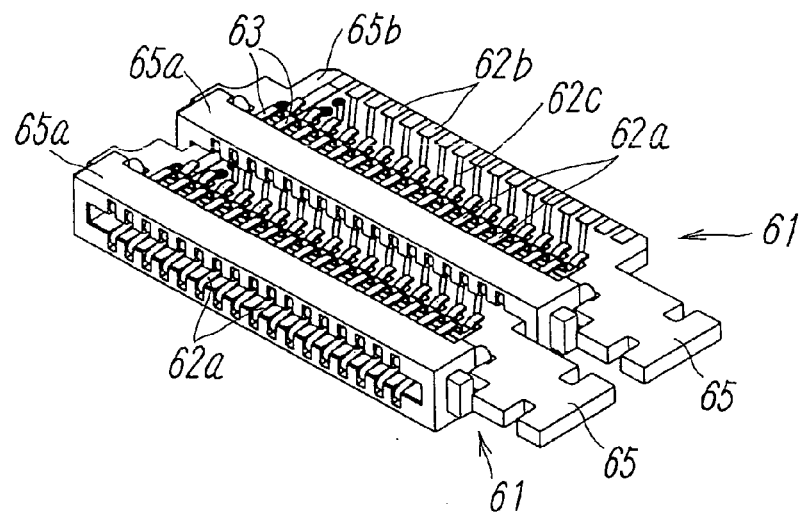
FIG. 7 is a perspective view of a coupling connector, and illustrates a state in which two connectors are coupled.
Figure 8:
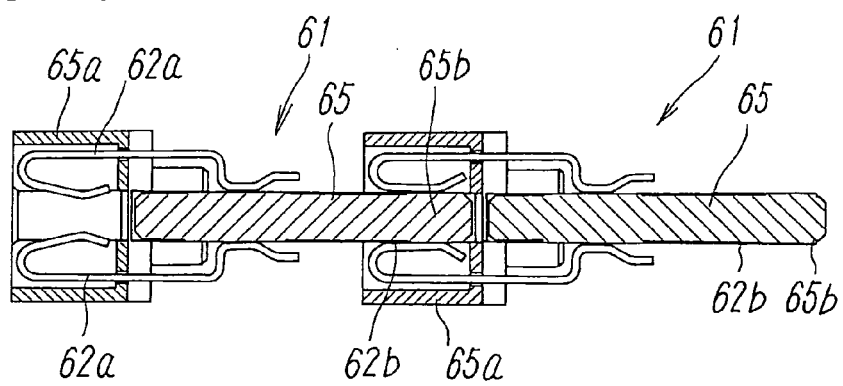
FIG. 8 is a magnified cross-sectional view in FIG. 7.

A coupling connector 61 including plurality of connection terminals 62a and 62b and an extracting terminal 63 is supported in a cantilever manner in the bottom end portion of the adapter block 50 by inserting an attachment portion 61a of one end thereof into an attachment hole 50b of the adapter block 50. This coupling connector 61, which is also used for power supply and for signal transmission, includes a connector board 65 having a recessed reception portion 65a and a protruding insertion portion 65b on both ends thereof in the horizontal-width direction, the connection terminals 62a and 62b, which are provided in the reception portion 65a and the insertion portion 65b respectively, mutually electrically connected due to printed wiring 62c, and the extracting terminal 63 conducting with a part of the connection terminals, as can be understood from FIG. 7 and FIG. 8.

Of the plurality of connection terminals 62a and 62b, the connection terminal 62a on the reception portion 65a side is configured of a pair of elastic fittings facing each other, and the connection terminal 62b on the insertion portion 65b side is printed on the connector board 65. When the plurality of solenoid valves 1 are coupled, the reception portion 65a and the insertion portion 65b of the coupling connector 61 of the adjacent solenoid valves 1 are fitted by the insertion method, and the corresponding connection terminals are electrically connected.

The extracting terminal 63 of the coupling connector 61 is electrically connected to the coil terminals 57 and 57 of the pilot valves 7a and 7b via an electroconductive mechanism 66. This electroconductive mechanism 66 includes and electroconductive board 68 connected to the end portion of the coupling connector 61 in the vertical direction, plurality of board terminals 69a and 69b protruding from this electroconductive board 68 to the center base 50a, and plurality of electroconductive fittings 70a and 70b electrically connecting these board terminals 69a and 69b with the coil terminals 57 and 57 of the respective pilot valves 7a and 7b.

The electroconductive board 68 is disposed so as to intersect to the center base 50a in the tip of the center base 50a, and a positioning pin 50c provided in the tip of the center base 50a is fitted in a center positioning hole 68a. The board terminals 69a and 69b correspond to the one pilot valve as a pair of the left and right terminals, two pairs of the board terminals 69a and 69a, and the board terminals 69b and 69b corresponding to the two pilot valves 7a and 7b are vertically disposed, and conduct with the extracting terminal 63 of the coupling connector 61 by means of the printed wiring on the electroconductive board 68. The tips of the respective board terminals 69a and 69b are inserted in fitting accommodating chambers 71, which are disposed in the top and bottom faces of the center base 50a from terminal holes 50d of the tip of the center base 50a.

The electroconductive fittings 70a and 70b correspond to the board terminals 69a and 69b, and the coil terminals 57, and each of the electroconductive fittings 70a and 70b is provided in a pair as to each pilot valve. More specifically, the two electroconductive fittings 70a and 70a, and the two electroconductive fittings 70b and 70b are disposed in a state in which these are accommodated within the fitting accommodating chambers 71 on the top face side and the bottom face side of the center base 50a. The electroconductive fittings 70a and 70b are made up of a slender metal plate excellent in electroconductivity, and include main body portions 72 extending along the center base 50a, and elastic terminal portions 73a and 73b positioned at both ends of the main body portion 72, and these elastic terminal portions 73a and 73b are flexibly in contact with the coil terminals 57 and the board terminals 69a and 69b from the side-face direction.

The flat-shaped end portion of the metal plate being folded in the axial direction forms the elastic terminal portions 73a and 73b. Of the elastic terminal portions 73a and 73b, the first elastic terminal portions 73a which are in contact with the board terminal 69a or 69b are formed by folding the end portion of the plate once since the distance to the board terminal 69a or 69b is close. On the other hand, the second elastic terminal portions 73b on the opposite side which are in contact with the coil terminals 57 are formed in a state in which the end portion of the plate is folded in plurality of stages (waveforms) since the distance to the coil terminals 57 is far.

Also, contact elastic pieces 72a being flexibly in contact with the side walls of the fitting accommodating chambers 71 are formed in an inclined out-swinging state on both side edges of the main body portions 72, and the electroconductive fittings 70a and 70b are flexibly retained within the fitting accommodating chambers 71 due to these contact elastic pieces 72a.

Furthermore, a cover 76 in the shape of a generally square with one end open is detachably attached to the adapter block 50. This cover 76 integrally includes an upper wall portion 76a, a bottom wall portion 76b, and a side wall portion 76c, and these respective wall portions cover the top and bottom faces, and the side face of the solenoid operating unit 4. The coupling connector 61 is supported by the bottom wall portion 76b from outside.

With the solenoid operating unit 4 thus configured, each component of this solenoid operating unit 4 can be disassembled at the time of maintenance and inspection. At this time, the electroconductive fittings 70a and 70b electrically connecting the coil terminals 57 with the board terminals 69a and 69b are configured to include the folding-type elastic terminal portions 73a and 73b on both ends thereof, and these elastic terminal portions 73a and 73b are flexibly contacted to the coil terminals 57 and the board terminals 69a and 69b from the side-face direction, thereby facilitating work for disassembling and assembling the solenoid operating unit 4 as compared to the insertion method for connecting between the terminals. In other words, in the case of the insertion method, the direction for attaching/detaching the pilot valves 7a and 7b to/from the center base 50a is different from the direction for attaching/detaching between the terminals, and stroke for the sake thereof often increases, resulting in making the aforementioned work difficult, but employing the contact method as described above allows the direction for attaching/detaching the pilot valves 7a and 7b to/from the center base 50a to be equal to the direction for connecting/separating between the terminals, hereby markedly simplifying the aforementioned work.

Note that the pilot discharge communication hole 60 is formed within the adapter block 50 so as to pass through the block in the valve-width direction. The pilot discharge communication hole 60 includes a connection tube 77 and a seal member (not shown) in the same way as with the pilot supply communication hole 30.

The aforementioned embodiment relates to the double-pilot-type solenoid valve including the two pilot valves 7a and 7b, but the present invention may be similarly applied to a single-pilot-type solenoid valve including only the first pilot valve 7a. This single-pilot-type solenoid valve can be provided by omitting the second pilot valve 7b corresponding to the small-diameter second piston 14b and the second manual button 18b in the double-pilot-type solenoid valve, or by locking these in an inoperative state and communicating the second pilot pressure chamber 35b with the pilot supply communication hole 30 all the time. More specifically, a single-pilot-type solenoid valve including essentially the same outer shape as the double-pilot-type solenoid valve can be provided by attaching a dummy block having the same outer shape instead of the second pilot valve 7b, and locking the second manual button 18b in an operating state, thereby providing the single-pilot-type solenoid valve having essentially the same outer shape as the double-pilot-type solenoid valve. In this case, members such as the electro-conductive fittings 70b or the like relating to the omitted pilot valves are also omitted.

In the event that a solenoid valve assembly is configured of the coupling solenoid valve 1 having the aforementioned configuration, as illustrated in FIG. 9, the plurality of solenoid valves 1, a port block 80 including an air supply port 80a and discharge port 80b for connection in bulk, a connector block 81 including an external connection connector 82 for power supply in bulk, and an end block 83 positioned outside of the port block 80 are arrayed on the rail 45 such as shown in the drawing, and are sequentially coupled so as to be fixed on the rail 45. In FIG. 9, a state in which only a part of the solenoid valves 1 are mutually coupled, and connected with the hook 43 is illustrated, but all of the solenoid valves 1 and the aforementioned respective blocks 80, 81, and 83 are sequentially coupled, and mutually connected with the hook in the same way.

Therefore, the port block 80 positioned in the middle includes a movable binding member 84 having the same configuration as that provided in the solenoid valve 1, a hook 84a, which is formed under the binding member 84, protruding on the first coupling face side (right side in FIG. 9), and an engaging portion positioned on the second coupling face side (left side in FIG. 9), the end block 83 includes the movable binding member 84, the hook 84a, which is formed under the binding member 84, protruding on the first coupling face side, and the connector block 81 includes an engaging portion positioned on the second coupling face side. The hook 84a of the end block 83 is engaged with the engaging portion of the port block 80, the hook 84a of the port block 80 is engaged with the engaging portion 42 of the solenoid valve 1 positioned on one end of the solenoid valve array, and the hook 43 of the solenoid valve 1 positioned on the other end of the solenoid valve array is engaged with the engaging portion of the connector block.

Also, the plurality of coupling communication holes 15 and 16, the pilot supply communication hole 30, and the pilot discharge communication hole 60 are formed in the aforementioned respective blocks 80, 81, and 83, in the same way as the solenoid valve 1, and the corresponding communication holes are mutually connected, but while the aforementioned respective communication holes in the case of the port block 80 are formed so as to pass through the port block 80, the end portions of the respective communication holes in the case of the end block 83 and the connector block 81 are sealed within each block.

Figure 10:
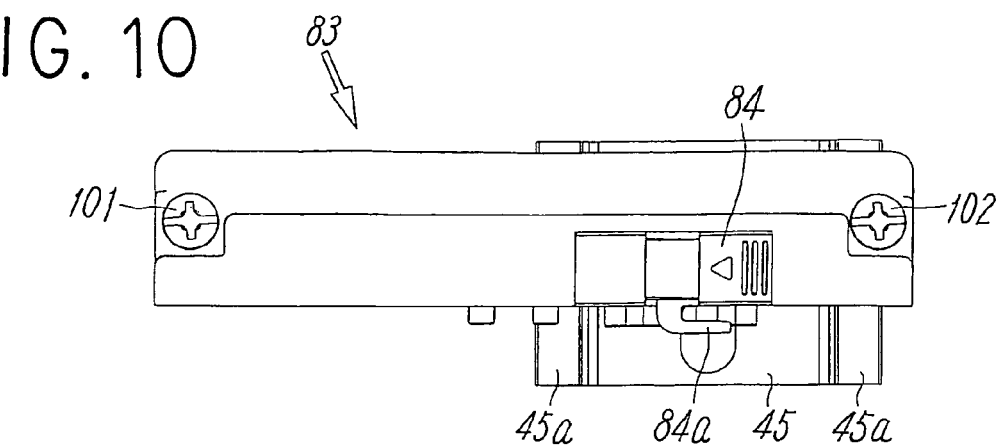
FIG. 10 is a top view of an end block.
Figure 11:
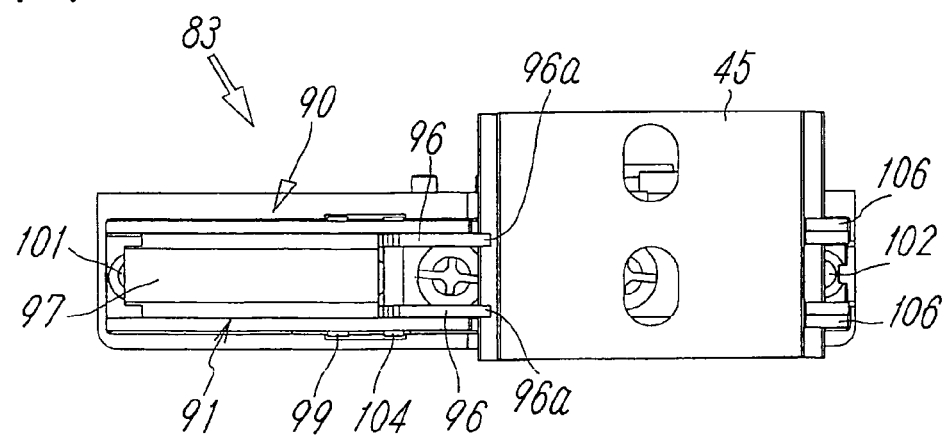
FIG. 11 is a bottom view of the end block.
Figure 12:
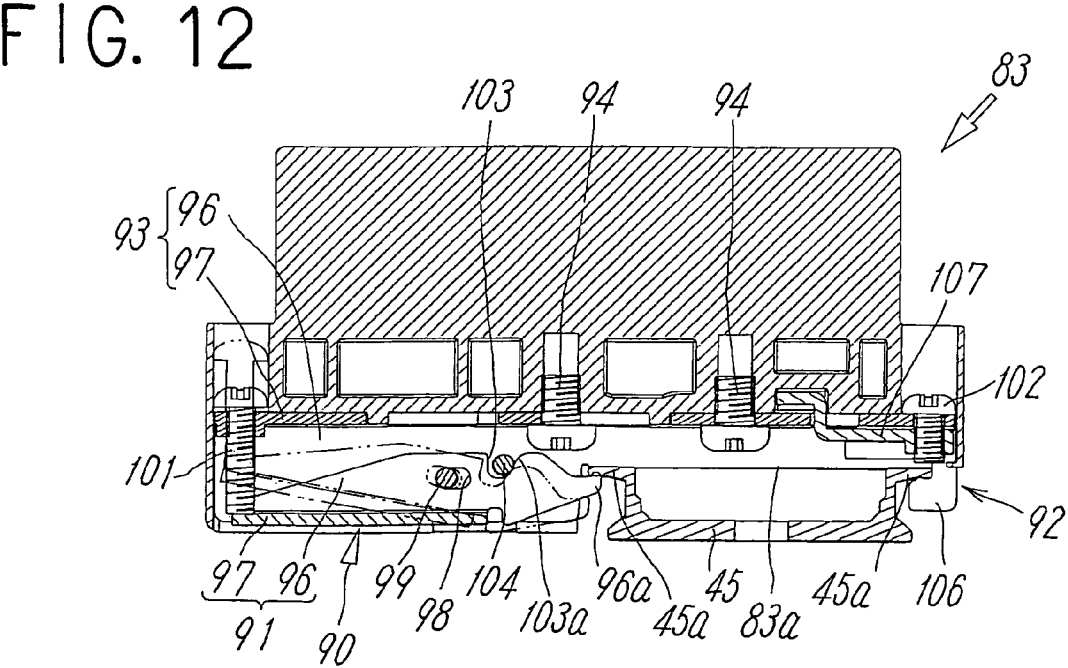
FIG. 12 is a cross-sectional view of the end block.

The respective solenoid valves 1 and the respective blocks 80, 81 and 83 are attached to the rail 45 by fixing the end block 83 and the connector block 81, which are positioned on both ends of the solenoid valve array, to the rail 45. In FIG. 10 through FIG. 12, a fixing mechanism 90 for fixing the end block 83 to the rail 45 is illustrated. The same fixing mechanism as this is provided with the connector block 81, but here, description will be made regarding the fixing mechanism 90 of the end block 83, and description will be omitted regarding the fixing mechanism of the connector block 81.

The fixing mechanism 90, which is disposed within a space portion formed in the bottom of the end block 83, includes a first fixing member 91 to be locked in one side of the flange portion 45a of the rail 45, and a second fixing member 92 to be locked in the other side of the flange portion 45a. These fixing members 91 and 92 are attached within a groove-shaped holder 93, and this holder 93 is detachably attached within the space portion of the end block 83 using a screw 94.

The first fixing member 91 is made up of a pair of left and right side frame pieces 96 and 96 extending in the axial direction of the end block 83, and bottom frame pieces 97 connecting the bottoms of both side frame pieces 96 and 96. A slot 98 extending in the longitudinal direction is formed in both side frame pieces 96 and 96, on the other hand, a supporting shaft 99 passing through the slot 98 is attached to both left and right side walls 93a and 93a of the holder 93, and the first fixing member 91 is attached to the holder 93 so as to turn on this supporting shaft 99. The tips of both side frame pieces 96 and 96 serve as locking portions 96a, which extend within a recessed-stage-shaped rail attachment portion 83a of the bottom of the end block 83 so as to be capable of detachably engaging with the flange portions 45a of the rail 45 from underneath.

On the other hand, a first fixing screw 101 is attached to the position corresponding to the rear end portion of the bottom frame piece 97 in the ceiling wall 93b of the holder 93 so as to advance and retreat vertically. When this first fixing screw 101 is fastened downward, the first fixing member 91 occupies the position illustrated in a solid line in FIG. 12 by the rear end portion of the bottom frame piece 97 being depressed, and the locking portions 96a and 96a of the tips of side frame pieces 96 and 96 are locked in the flange portions 45a of the rail 45, on the other hand, when the first fixing screw 101 is unfastened, as illustrated in a dashed line in FIG. 12, the first fixing member 91 turns centered on the supporting shaft 99 such that the locking portions 96a and 96a come out of the flange portions 45a. At this time, the following devices are arranged such that the first fixing member 91 retreats to the dashed line position, and the locking portions 96a and 96a completely come out of the flange portions 45a.

That is to say, a generally U-shaped recessed groove 103 is formed at a position closer to the tip than the slot 98 on the upper edges of both side frame pieces 96 and 96, and a groove edge 103a in front of the recessed groove 103 inclines in a direction gradually expanding upward. On the other hand, guide shafts 104 are attached to the left and right side walls 93a and 93a of the holder 93, and these guide shafts 104 are fitted in the recessed groove 103. When the first fixing screw 101 is unfastened so as to come out of the rail 45, the first fixing member 91 retreats to the dashed line position such that the locking portion 96a come out of the flange portions 45a by the inclining groove edge 103a of the recessed groove 103 moving along the guide shafts 104.

Also, the second fixing member 92 is made up of a pair of left and right fishhook-shaped locking pieces 106 and 106 extending from the end portion of the rail attachment 83a of the end block 83 downward, and an upper frame piece 107 connecting the upper ends of the locking pieces 106 and 106, and this upper frame piece 107 is attached to the ceiling wall 93b of the holder 93 with a second fixing screw 102 so as to move vertically. When this second fixing screw 102 is fastened, the locking pieces 106 and 106 are locked in the flange portion 45*a* of the rail 45 from underneath by the upper frame piece 107 being raised, on the other hand, when the second fixing screw 102 is unfastened, the locking pieces 106 and 106 come out of the flange portion 45*a* by the upper frame piece 107 moving downward.

Note that both double-pilot-type solenoid valves and single-pilot-type solenoid valves may be included as the plurality of solenoid valves.

The solenoid valves to which the present invention is applied are not restricted to the 5-port type; rather, a 3-port type for example, may be employed.

The invention claimed is:

1. A coupling solenoid valve of which both side faces in the valve-width direction correspond to a first coupling face (8*a*) and a second coupling face (8*b*) for being coupled with another solenoid valve, said coupling solenoid valve comprising:
    a main valve unit (3) including
        a plurality of coupling communication holes (15 and 16) passing through in the valve-width direction,
        a valve hole (10) through which said coupling communication holes (15 and 16) mutually communicate, and
        a spool (6) for switching a channel accommodated within said valve hole (10); and
    a solenoid operating unit (4) connected with said main valve unit (3);
    wherein said solenoid operating unit (4) comprises
        an adapter block (50) attached to said main valve unit (3),
        a center base (50*a*) extending from this adapter block (50),
        one or two pilot valves (7*a* and 7*b*) detachably assembled to this center base (50*a*),
        a coupling connector (61), which is mutually connected to an insertion type when plurality of solenoid valves are coupled, for electrically connecting between the adjacent solenoid valves, and
        an electroconductive mechanism (66) for electrically connecting this coupling connector (61) to said pilot valves (7*a* and 7*b*);
    said electroconductive mechanism (66) comprises
        an electroconductive board (68) electrically connected to said coupling connector (61),
        board terminals (69*a* and 69*b*) protruding from this electroconductive board (68),
        a coil terminal (57) formed on the side face on said center base (50*a*) side of said pilot valves (7*a* and 7*b*), and
        electroconductive fittings (70*a* and 70*b*) electrically connecting this coil terminal (57) with said board terminals (69*a* and 69*b*); and
    these electroconductive fittings (70*a* and 70*b*) are supported by said center base (50*a*), and include elastic terminal portions (73*a* and 73*b*) formed by being folded on both end portions, and these elastic terminal portions (73*a* and 73*b*) are flexibly in contact with said coil terminal (57) and said board terminals (69*a* and 69*b*) from the side-face direction.

2. A coupling solenoid valve according to claim 1, wherein said electroconductive fittings (70*a* and 70*b*) which are made up of a slender metal plate comprise a main body portion (72) extending along said center base (50*a*), and said elastic terminal portions (73*a* and 73*b*) positioned on both ends of this main body portion (72); and
    these elastic terminal portions (73*a* and 73*b*) are formed by the end portion of said metal plate being folded in a flat shape.

3. A coupling solenoid valve according to claim 1, wherein a cover (76) in the shape of a generally square with one end open is detachably attached to said adapter block (50), and this cover (76) covers the top and bottom faces of said solenoid operating unit (4) and the end face of the tip side of said center base (50*a*).

4. A coupling solenoid valve according to claim 2, wherein a cover (76) in the shape of a generally square with one end open is detachably attached to said adapter block (50), and this cover (76) covers the top and bottom faces of said solenoid operating unit (4) and the end face of the tip side of said center base (50*a*).

5. A coupling solenoid valve according to claim 3, wherein said coupling connector (61) comprises a connector board (65) having a recessed reception portion (65*a*) and a protruding insertion portion (65*b*) on both ends in the horizontal-width direction, a plurality of connection terminals (62*a* and 62*b*) respectively formed in the reception portion (65*a*) and the insertion portion (65*b*) and mutually electrically connected by printed wiring (65*c*), and an extracting terminal (63) which conducts with a part of the connection terminals; and
    said electroconductive board (68) is electrically connected to this extracting terminal (63).

6. A coupling solenoid valve according to claim 4, wherein said coupling connector (61) comprises a connector board (65) having a recessed reception portion (65*a*) and a protruding insertion portion (65*b*) on both ends in the horizontal-width direction, a plurality of connection terminals (62*a* and 62*b*) respectively formed in the reception portion (65*a*) and the insertion portion (65*b*) and mutually electrically connected by printed wiring (65*c*), and an extracting terminal (63) which conducts with a part of the connection terminals; and
    said electroconductive board (68) is electrically connected to this extracting terminal (63).

7. A coupling solenoid valve according to claim 5, wherein said coupling connector (61) comprises a connector board (65) having a recessed reception portion (65*a*) and a protruding insertion portion (65*b*) on both ends in the horizontal-width direction, a plurality of connection terminals (62*a* and 62*b*) respectively formed in the reception portion (65*a*) and the insertion portion (65*b*) and mutually electrically connected by printed wiring (65*c*), and an extracting terminal (63) which conducts with a part of the connection terminals; and
    said electroconductive board (68) is electrically connected to this extracting terminal (63).

\* \* \* \* \*